United States Patent
Ko et al.

(10) Patent No.: US 9,479,893 B2
(45) Date of Patent: *Oct. 25, 2016

(54) METHOD AND APPARATUS FOR IDENTIFYING NEIGHBORING DEVICE

(71) Applicant: SAMSUNG ELECTRONICS CO., LTD., Gyeonggi-do (KR)

(72) Inventors: Chang-seog Ko, Hwaseong-si (KR); Hyun-cheol Park, Suwon-si (KR); Young-sun Kim, Suwon-si (KR); Yoo-jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,609

(22) Filed: Apr. 6, 2015

(65) Prior Publication Data

US 2015/0215726 A1 Jul. 30, 2015

Related U.S. Application Data

(63) Continuation of application No. 12/020,751, filed on Jan. 28, 2008, now Pat. No. 9,002,382.

(30) Foreign Application Priority Data

Jul. 4, 2007 (KR) .................. 10-2007-0067144

(51) Int. Cl.
*H04W 24/00* (2009.01)
*H04M 3/42* (2006.01)
(Continued)

(52) U.S. Cl.
CPC .............. *H04W 4/008* (2013.01); *H04L 67/18* (2013.01); *H04W 4/02* (2013.01); *H04W 4/021* (2013.01); *H04W 4/028* (2013.01); *H04W 8/005* (2013.01); *H04L 67/16* (2013.01)

(58) Field of Classification Search
CPC ....... H04W 4/02; H04W 8/08; H04W 48/16; H04W 64/00; H04L 29/08657

USPC ........... 455/456.1, 456.2, 456.3, 456.6, 457, 455/414.1, 414.2, 41.1, 41.2
See application file for complete search history.

(56) References Cited

U.S. PATENT DOCUMENTS 6,246,376 B1 6/2001 Bork et al.
2003/0032436 A1* 2/2003 Mikuni .................. G01C 21/20
455/457

(Continued)

FOREIGN PATENT DOCUMENTS

KR 2000-0012209 A 3/2000
KR 10-2004-0097397 A 11/2004

(Continued)

OTHER PUBLICATIONS

Communication dated Jul. 9, 2013 issued by the Korean Intellectual Property Office in counterpart Korean Patent Application No. 10-2007-0067144.

(Continued)

*Primary Examiner* — Dung Hong
(74) *Attorney, Agent, or Firm* — Sughrue Mion, PLLC

(57) ABSTRACT

A method and apparatus for identifying a neighboring device are provided. The method of identifying a neighboring device, which is performed in a user terminal, includes: obtaining identification information and location information of a plurality of neighboring devices that can wirelessly communicate with the user terminal; extracting the identification information of one of the neighboring devices, the neighboring device being in the actual location range within the field of vision of the user terminal; and using the extracted identification information to request that the neighboring device perform wireless communication with the user terminal. According to the method and apparatus, identification information of a neighboring device with which a user terminal desires to perform wireless communication can be obtained using a viewfinder or liquid crystal display of the user terminal.

20 Claims, 6 Drawing Sheets

(51) Int. Cl.
*H04W 4/00* (2009.01)
*H04W 4/02* (2009.01)
*H04W 8/00* (2009.01)
*H04L 29/08* (2006.01)

(56) References Cited

U.S. PATENT DOCUMENTS

| | | | |
|---|---|---|---|
| 2004/0002346 A1 | 1/2004 | Santhoff | |
| 2004/0192331 A1* | 9/2004 | Gorday | H04W 4/14 455/456.1 |
| 2005/0001024 A1* | 1/2005 | Kusaka et al. | 235/375 |
| 2005/0048987 A1* | 3/2005 | Glass | H04M 1/72544 455/456.1 |
| 2006/0274743 A1* | 12/2006 | Yegin et al. | 370/389 |
| 2007/0066323 A1* | 3/2007 | Park | G01S 5/02 455/456.2 |
| 2007/0264991 A1 | 11/2007 | Jones et al. | |

FOREIGN PATENT DOCUMENTS

| | | |
|---|---|---|
| KR | 10-2006-0057938 A | 5/2006 |
| KR | 10-2007-0033683 A | 3/2007 |
| WO | 01/13548 A1 | 2/2001 |

OTHER PUBLICATIONS

Communication dated Jan. 27, 2014 from the Korean Intellectual Property Office in a counterpart Korean application No. 10-2007-0067144.

* cited by examiner

METHOD AND APPARATUS FOR IDENTIFYING NEIGHBORING DEVICE

CROSS-REFERENCE TO RELATED PATENT APPLICATIONS

This application is a Continuation Application of U.S. application Ser. No. 12/020,751 filed Jan. 28, 2008, which claims priority from Korean Patent Application No. 10-2007-0067144, filed on Jul. 4, 2007 in the Korean Intellectual Property Office, the disclosures of which are incorporated herein in their entirety by reference.

BACKGROUND OF THE INVENTION

1. Field of the Invention

Methods and apparatuses consistent with the present invention relate to identification of a neighboring device, and more particularly, to identifying a neighboring device of a user terminal.

2. Description of the Related Art

Wireless communication technologies allow network access without restriction of wired connections, and can be classified into infrared ray communication methods based on the Infrared Data Association (IrDA) and radio frequency (RF) (high frequency) communication methods. Infrared ray communication methods have a simple structure and require low power consumption, but can operate only at short range with user terminals having a direct line of sight between each other, thereby making it is difficult to perform communication when an obstacle exists. RF-type short-distance wireless communication technologies operate omnidirectionally and are not affected by obstacles. The RF-type short-distance wireless communication technologies include wireless local area network (WLAN), Bluetooth, ZigBee, and WiBro technologies. With the development of wireless communication technologies, the variety of digital devices capable of performing wireless communication has increased. With the widespread use of small and light mobile devices such as personal digital assistants (PDAs), portable media players (PMPs), mobile phones, and navigation systems, users can now use such digital devices at any time or location.

In order for a user having a user terminal, such as a mobile device to wirelessly communicate with another device, the user should select a predetermined device from neighboring devices capable of wirelessly communicating with the user terminal. However, when there are many similar neighboring devices capable of wireless communication, it is difficult to identify a particular device from among the many neighboring devices.

SUMMARY OF THE INVENTION

The present invention provides a method and apparatus for identifying a neighboring device of a user terminal by using a viewfinder or liquid crystal display (LCD) of the user terminal.

The present invention also provides a method and apparatus for easily and simply identifying a neighboring device of a user terminal by which a device with which the user desires to communicate can be selected while watching neighboring devices through a screen of a user terminal.

The present invention also provides a method and apparatus for identifying a neighboring device of a user terminal by which identification information of a desired neighboring device can be obtained by using location information of the user terminal and neighboring devices.

The present invention also provides a method and apparatus for identifying a neighboring device of a user terminal by which the user terminal can photograph a neighboring device displayed on a viewfinder or an LCD of the user terminal and generate a media signal and at the same time the user terminal can transmit the generated media signal to the neighboring device positioned on a screen of the user terminal.

According to an aspect of the present invention, there is provided a method of identifying a neighboring device, which is performed in a user terminal and includes: obtaining an actual location range within a field of vision of the user terminal; receiving identification information and location information of a plurality of neighboring devices that can wirelessly communicate with the user terminal, from the neighboring devices; using the actual location range within the field of vision of the user terminal and the location information and identification information of the neighboring devices to extract the identification information of one of the neighboring devices, the selected neighboring device being in the actual location range within the field of vision of the user terminal; and using the extracted identification information to request the neighboring device located within the field of vision of the user terminal to perform wireless communication with the user terminal.

The obtaining the actual location range within the field of vision of the user terminal may include: obtaining the location information of the user terminal; obtaining the field of vision of the user terminal; and obtaining the actual location range within the field of vision of the user terminal based on the location information and the field of vision of the user terminal.

The extracting the identification information of the neighboring device within the field of vision of the user terminal may include: selecting a neighboring device which is located in the actual location range within the field of vision of the user terminal, among the neighboring devices that can perform wireless communication with the user terminal; and extracting the identification information of the selected neighboring device.

The requesting the neighboring device located within the field of vision of the user terminal to perform wireless communication with the user terminal may include: displaying the neighboring devices located within the field of vision of the user terminal on a viewfinder of the user terminal; receiving a selection of a neighboring device which is to be requested to perform wireless communication with the user terminal, among the displayed neighboring devices; and requesting the selected neighboring device to perform wireless communication with the user terminal.

The displaying the neighboring devices may include: converting the locations of the neighboring devices to locations on the viewfinder, based on the location information of the neighboring devices within the field of vision, the location information of the user terminal, the viewing angle of the user terminal, and a size of the viewfinder of the user terminal; and displaying the neighboring devices on the converted locations on the viewfinder.

The receiving of the selection of the neighboring device may be performed using one of a keyboard, a touchpad, a touch screen, a joystick, a mouse, and a remote controller.

The method may further include: photographing neighboring devices within the field of vision of the user terminal and generating a media signal; and requesting the neighboring devices within the field of vision of the user terminal to perform wireless communication with the user terminal and transmitting the media signal to the neighboring devices.

The obtaining the location information of the user terminal may include: receiving a wireless signal from a base station; and obtaining the location information of the user terminal based on the received wireless signal.

The location information of the user terminal may include at least one of latitude, longitude, direction of the field of vision, and altitude.

The wireless communication may include short-distance wireless communication using at least one of wireless local area network (WLAN), Bluetooth, ZigBee, and WiBro technologies.

The method may further include: obtaining from the neighboring device identification information of other devices belonging to the user of the neighboring device which is requested to perform wireless communication with the user terminal; and requesting, based on the obtained identification information of the other devices, the other devices to perform wireless communication with the user terminal.

According to another aspect of the present invention, there is provided a method of identifying a neighboring device, which is performed in a user terminal and includes: focusing on a neighboring device which is to be requested to perform communication with the user terminal among a plurality of neighboring devices that can perform wireless communication with the user terminal; obtaining location information of the neighboring device, obtaining identification information of the neighboring device based on the location information of the neighboring device; and requesting the neighboring device to perform wireless communication with the user terminal, based on the identification information.

According to another aspect of the present invention, there is provided a method of transmitting identification information performed by a user terminal, the method including: obtaining location information of the user terminal; receiving a request to transmit identification information of the user terminal from the neighboring device that can perform wireless communication with the user terminal if a difference between the location information of the user terminal and the location information transmitted from the neighboring device is within a predetermined range; and if the difference is within the predetermined range, transmitting the identification information of the user terminal to the neighboring device.

According to another aspect of the present invention, there is provided a user terminal for identifying a neighboring device, the apparatus including: a location information processing unit which obtains an actual location range within a field of vision of the user terminal, and extracts, based on identification information and location information of a neighboring device received from the neighboring device, the identification information of the neighboring device in the actual location range within the field of vision of the user terminal; a wireless communication unit which receives the identification information and location information of the neighboring device from the neighboring device, and requests, based on the identification information of the neighboring device within the field of vision of the user terminal, the neighboring device located within the field of vision to perform wireless communication with the user terminal; and a media signal processing unit which photographs a view within a field of vision of the user terminal and generates a media signal.

According to another aspect of the present invention, there is provided a user terminal for identifying a neighboring device, the user terminal including: a location information processing unit which obtains location information of a user terminal, and obtains, based on the location information of the user terminal, location information of a neighboring device on which the user terminal is focused; a wireless communication unit which transmits the location information of the neighboring device on which the user terminal is focused to a plurality of neighboring devices that can perform wireless communication with the user terminal, requests the neighboring device at the location indicated by the location information to transmit identification information, receives the identification information of the neighboring device from the neighboring device at the location indicated by the location information and requests, based on the identification information, the neighboring device on which the user terminal is focused to perform wireless communication with the user terminal; and a media signal processing unit which photographs a view within a field of vision of the user terminal and generates a media signal.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
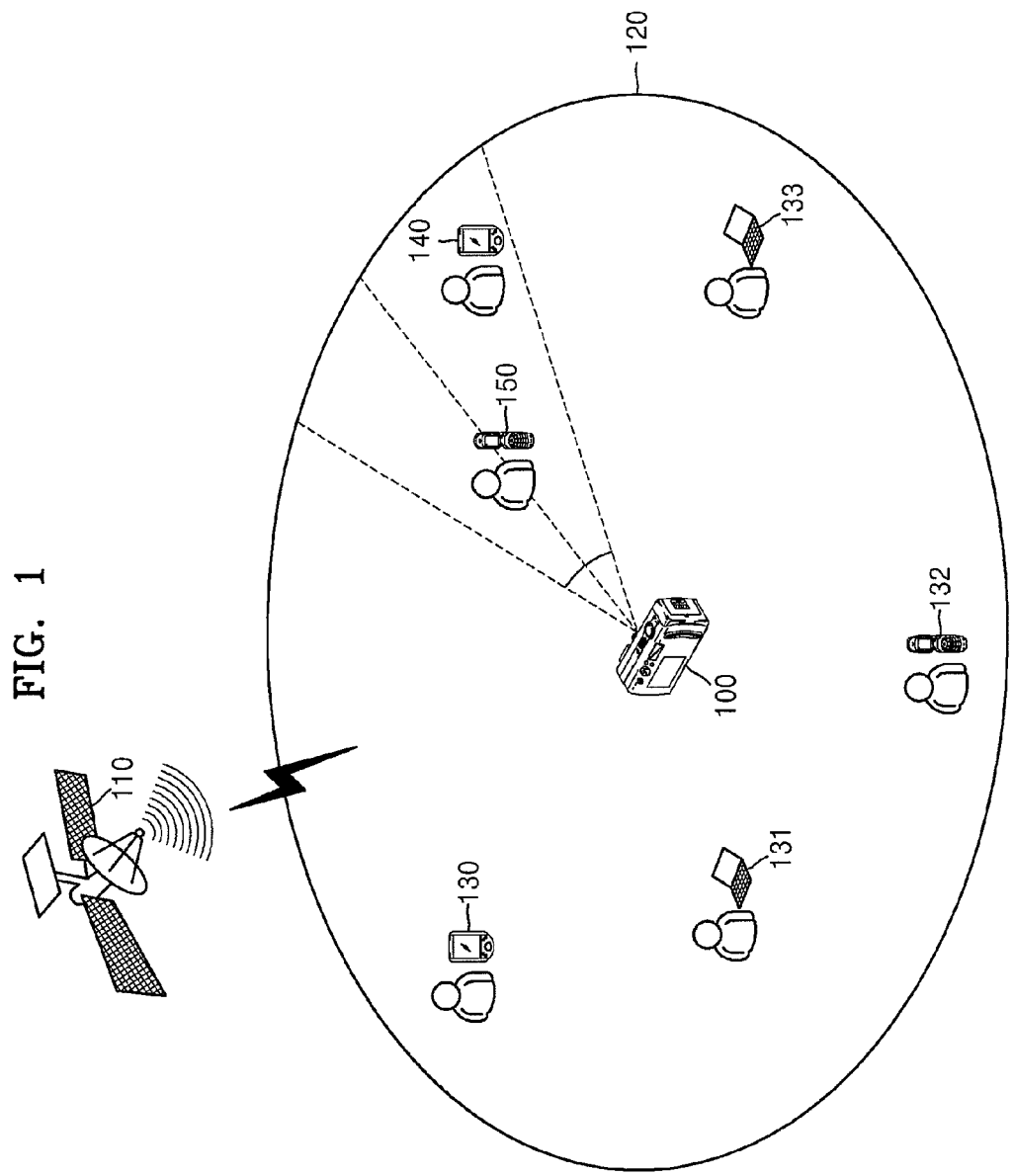
FIG. 1 is a diagram illustrating a neighboring device identification system according to an exemplary embodiment of the present invention.

FIG. 1 is a diagram illustrating a neighboring device identification system according to an exemplary embodiment of the present invention. Referring to FIG. 1, the neighboring device identification system according to the current embodiment of the present invention includes a user terminal 100, a global positioning system (GPS) satellite 110, and neighboring devices 130, 131, 132, 133, 140, and 150. In the exemplary embodiment, the user terminal 100 and the neighboring devices 130, 131, 132, 133, 140, and 150 may be PDAs, PMPs, mobile phones, navigation systems, notebooks, and/or any other similar portable devices that are capable of wireless communication with other devices. The user terminal 100 can perform short-distance wireless communication with neighboring devices located within a predetermined range 120 (in this case, the neighboring devices 130, 131, 132, 133, 140, and 150). The short-distance wireless communication can be performed using at least one of wireless local area network (WLAN), Bluetooth, ZigBee, and WiBro technologies.

In the exemplary embodiment of the present invention, the user terminal 100 and the neighboring devices 130, 131, 132, 133, 140, and 150 identify their respective locations. Methods of identifying location by using wireless communication include a method of identifying the location based on a base station, a method of identifying the location by using a GPS satellite, and a method of combining the location identifying technology based on a base station and the location identifying technology using the GPS satellite. In FIG. 1, the user terminal 100 and the neighboring devices 130, 131, 132, 133, 140, and 150 receive GPS signals from the GPS satellite 110, thereby obtaining their location information. However, the present invention is not limited to such a method, and the user terminal 100 and the neighboring devices 130, 131, 132, 133, 140, and 150 may identify their locations based on a base station. Each of the user terminal 100 and the neighboring devices 130, 131, 132, 133, 140, and 150 may receive a GPS signal at each of a plurality of predetermined time intervals, or may receive a new GPS signal whenever the locations change due to movement and update the location information according to the new GPS signal. The location information may include latitude, longitude, altitude, and direction information.

Also, in the exemplary embodiment the user terminal 100 can perform camera functions, including photographing an object, generating a media signal, and editing the media signal. A user can photograph an image seen through a viewfinder or an LCD by using the viewfinder or the LCD included in the user terminal 100. By using its location information, the user terminal 100 may obtain the range of an image seen through the viewfinder or LCD, or may obtain the location information of an object on which the user terminal 100 is focused.

If a user wants to perform wireless communication between multiple neighboring devices, such as the neighboring devices 140 and 150, the user can adjust the location or direction of the user terminal 100 so that the neighboring devices 140 and 150 are positioned within the field of vision of the viewfinder or LCD included in the user terminal 100. The user terminal 100 can obtain the actual location range within the field of vision of the user terminal 100 by using its location information. The neighboring devices 130, 131, 132, 133, 140, and 150 obtain their location information, and transmit their location information and identification information to devices that can perform wireless communication with them. The user terminal 100 can select neighboring devices positioned within the field of vision of the user terminal 100, that is, the neighboring devices 140 and 150, by using the transmitted location information of the neighboring devices 130, 131, 132, 133, 140, and 150.

By using the identification information of the selected neighboring devices 140 and 150, the user terminal 100 can request the neighboring devices 140 and 150 within the field of vision of the user terminal 100 to perform short-distance wireless communication.

The user terminal 100 may be focused on a neighboring device that the user desires to communicate with, and may obtain identification information of the neighboring device. When the neighboring devices 130, 131, 133, 133, 140, and 150 do not transmit their location information and identification information to the user terminal 100, the user terminal 100 may be focused on a neighboring device that the user desires to communicate with, such as neighboring device 150, by using a viewfinder or LCD of the user terminal 100, and by using the location information obtained from said viewfinder or LCD, the user terminal 100 can obtain the location information of the neighboring device 150. The user terminal 100 transmits the obtained location information of the neighboring device 150 to all the neighboring devices 130, 131, 132, 133, 140, and 150 that can perform wireless communication with the user terminal 100, and requests a neighboring device having the transmitted location information to transmit the identification information of the neighboring device. If the location information received from the user terminal 100 corresponds to its location or indicates a location within a predetermined range from its location, the neighboring device, in this case, the neighboring device 150, transmits its identification information to the user terminal 100. By using the received identification information, the user terminal 100 can request the neighboring device 150 on which the user terminal 100 is focused to perform short-distance wireless communication.

Figure 2:
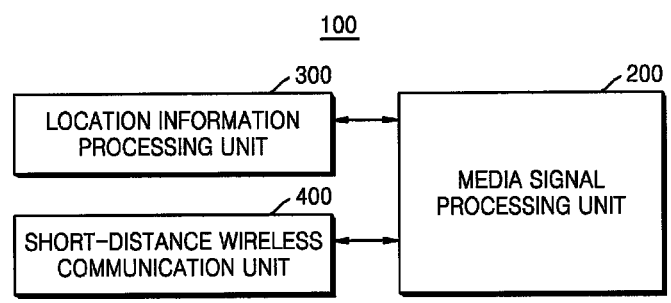
FIG. 2 is a block diagram illustrating an internal structure of a user terminal of the neighboring device identification system illustrated in FIG. 1, according to an exemplary embodiment of the present invention.

FIG. 2 is a block diagram illustrating an internal structure of the user terminal 100, according to an exemplary embodiment of the present invention. Referring to FIG. 2, the user terminal 100 according to the current embodiment of the present invention includes a media signal processing unit 200, a location information processing unit 300, and a short-distance wireless communication unit 400. The media signal processing unit 200 can photograph an object seen through a viewfinder or LCD of the user terminal 100 by using a camera lens, film or a charged-coupled device (CCD), thereby generating a media signal. Also, the media signal processing unit 200 can perform a variety of functions according to the type of the user terminal 100. For example, if the user terminal 100 is a mobile phone, the media signal processing unit 200 can perform a wireless call function, and if the user terminal 100 is an MP3 player, the media signal processing unit 200 can reproduce an audio signal. The user terminal 100 can identify its current location by using the location information processing unit 300. As described above, the location information processing unit 300 can obtain the location of the user terminal 100 based on a GPS signal received from a GPS satellite or based on a base station. By using its location information, the user terminal 100 can identify a neighboring device with which the user terminal 100 wants to perform short-distance wireless communication. The short-distance wireless communication unit 400 performs wireless communication with the neighboring devices 130, 131, 132, 133, and 140 that are located within a predetermined range 120 from the user terminal 100. The wireless communication may be performed by using at least one of WLAN, Bluetooth, ZigBee, and WiBro technologies.

Figure 3:
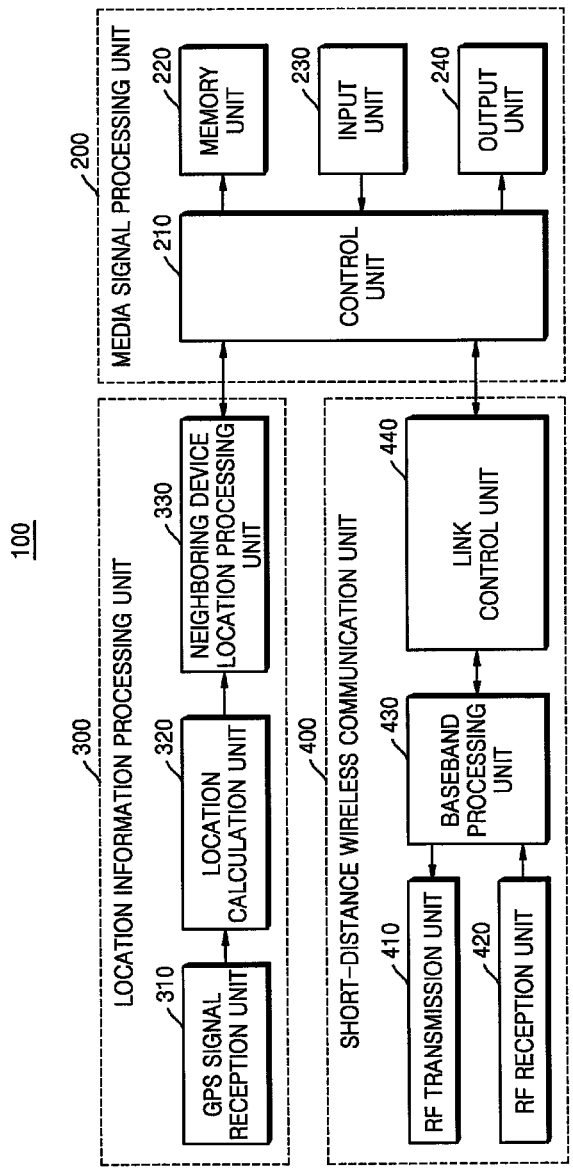
FIG. 3 is a block diagram illustrating an internal structure of a user terminal for performing a method of identifying a neighboring device, according to another exemplary embodiment of the present invention.

FIG. 3 is a detailed block diagram illustrating an internal structure of the user terminal 100 according to another exemplary embodiment of the present invention. Referring to FIG. 3, the user terminal 100 includes the media signal processing unit 200, the location information processing unit 300, and the short-distance wireless communication unit 400. The media signal processing unit 200 includes a control unit 210, a memory unit 220, an input unit 230, and an output unit 240. The control unit 210 controls overall operations of the user terminal 100, thereby allowing the user terminal 100 to perform the method of identifying neighboring devices according to the present invention. The control unit 210 includes an arithmetic logic unit (ALU) for calculation, and registers for temporarily storing data and instructions. The memory unit 220 stores programs required for generating media signals and performing the method of identifying neighboring devices. The memory unit 220 includes a high-speed main memory formed with storage media such as a random access memory (RAM), and a read-only memory (ROM), an auxiliary memory formed with long-term storage media such as a floppy disk, a hard disk, a tape, a CD-ROM, and flash memory, and an apparatus for storing data by using electric, magnetic, optical and other storage media. The input unit 230 receives inputs of commands, letters, numbers, or voice information from a user by using a physical transducer such as a keyboard, a mouse, a touchpad, a touch screen or a microphone, and informs the control unit 210 of the information. Also, the input unit 230 receives selection by the user of a neighboring device with which the user wants to perform short-distance wireless communication.

The output unit 240 outputs the overall state of the user terminal 100 or information input by the user through the input unit 230 through a screen or a speaker. The output unit 240 can include a display unit (not shown) for outputting a video signal in a media signal, a speaker (not shown) for outputting an audio signal, and an on-screen display (OSD) (not shown) processing unit for generating and outputting a user terminal control list. The display unit can include a viewfinder or LCD through which the user can watch an object, and focus on a desired object.

The location information processing unit 300 obtains the location of a neighboring device desired to communicate with, and includes a GPS signal reception unit 310, a location calculation unit 320, and a neighboring device location processing unit 330. The GPS signal reception unit 310 receives GPS signals from a plurality of GPS satellites. The location calculation unit 320 obtains the location information of the user terminal 100, by using the GPS signals received by the GPS signal reception unit 310. Also, by using the location information of the user terminal 100, the location calculation unit 320 may obtain an actual location range within the field of vision of the user terminal 100 which is seen through the viewfinder or LCD of the user terminal 100, or the actual location of a neighboring device 150 on which the user terminal 100 is focused. The neighboring device location processing unit 330 identifies a neighboring device with which the user terminal 100 wants to communicate, by using the location information of the user terminal 100 and the neighboring devices 130, 131, 132, 133, 140, and 150. If the user terminal 100 receives identification information and location information of the neighboring devices 130, 131, 132, 133, 140, and 150 that can perform short-distance wireless communication from the neighboring devices 130, 131, 132, 133, 140, and 150, the neighboring device location processing unit 330 stores the location information and identification information of the neighboring devices 130, 131, 132, 133, 140, and 150. The neighboring device location processing unit 330 identifies the neighboring devices 140 and 150 that are in the location range within the field of vision of the user terminal 100 using the stored location information of the neighboring devices 130, 131, 132, 133, 140 and 150 and extracts the identification information of the neighboring devices 140 and 150. If the user focuses the user terminal 100 on the neighboring device 150 with which the user wants to communicate, and wants to obtain the identification information of the neighboring device 150, the neighboring device location processing unit 330 can generate a message requesting the neighboring device 150 corresponding to the location information or neighboring devices located in a predetermined distance from the location indicated by the location information, to transmit identification information, by using the location information of the neighboring device 150 on which the user terminal 100 is focused.

The short-distance wireless communication unit 400 performs wireless communication with the neighboring devices 130, 131, 132, 133, 140, and 150 located in a predetermined range 120, and includes an RF transmission unit 410, an RF reception unit 420, a baseband processing unit 430, and a link control unit 440. The baseband processing unit 430 and the link control unit 440 are connected to the control unit 210 through a host control interface (HCI), and transmit and receive HCI packets, thereby communicating control commands and transmission and reception data with the control unit 210. The baseband processing unit 430 adds an access code and header to each of a variety of HCI data packets approved by the control unit 210, thereby changing the packet formats, and then, changes the formats again into a predetermined data packet for wireless communication, and transfers the data packets to the RF transmission unit 410. The RF transmission unit 410 modulates and amplifies the data packets for wireless communication generated in the baseband processing unit 430, to a predetermined frequency band, and then transmits the data packets. The user terminal 100 can transmit the location information and identification information of the user terminal 100 to the neighboring devices 130, 131, 132, 133, 140, and 150 in real-time, by using the RF transmission unit 410.

The RF reception unit 420 receives a signal, suppresses amplification of noise of the frequency signal, amplifies a signal in the set frequency band, then, reduces the signal to a lower frequency band, and provides the signal to the baseband processing unit 430. The RF reception unit 420 can receive the location information and identification information of the neighboring devices 130, 131, 132, 133, 140, and 150 from the neighboring devices 130, 131, 132, 133, 140, and 150 in real-time. The baseband processing unit 430 changes the data packets received through the RF reception unit 420, to HCI packets, and provides the HCI packets to the control unit 210. If the RF reception unit 420 receives the location information and identification information of the neighboring devices 130, 131, 132, 133, 140, and 150 from the neighboring devices 130, 131, 132, 133, 140, and 150, the baseband processing unit 430 informs the control unit 210 of the reception. The control unit 210 controls the received location information and identification information of the neighboring devices 130, 131, 132, 133, 140, and 150 to be stored in the neighboring device location processing unit 300. By using the location information and identification information of the neighboring devices 130, 131, 132, 133, 140, and 150, the neighboring device location processing unit 300 can identify the neighboring devices 140 and 150 located within the field of vision of the user terminal 100, and by using the RF transmission unit 410, the neighboring device location processing unit 300 can request the neighboring devices 140 and 150 located within the field of vision of the user terminal 100 to perform wireless communication.

If the user terminal 100 is focused on a neighboring device, such as the neighboring device 150, with which the user wants to communicate and wants to know the identification information of the neighboring device, the neighboring device location processing unit 330 obtains location information of the neighboring device 150 on which the user terminal 100 is focused. The user terminal 100 generates a message requesting the neighboring device 150 whose location information is the same as the obtained location information, to transmit identification information. The user terminal 100 can transmit the obtained location information and a message requesting transmission of the identification information to the neighboring devices 130, 131, 132, 133, 140, and 150 through the RF transmission unit 410. The neighboring device 150 corresponding to the location information transmitted from the user terminal 100, or whose location is within a predetermined range from the location indicated by the location information transmitted from the user terminal 100 can wirelessly transmit its identification information to the user terminal 100. The user terminal 100 obtains the identification information from the neighboring device 150 through the RF reception unit 420, and by using the obtained identification information, the user terminal 100 can request the neighboring device 150 to perform wireless communication, through the RF transmission unit 410.

Figure 4:
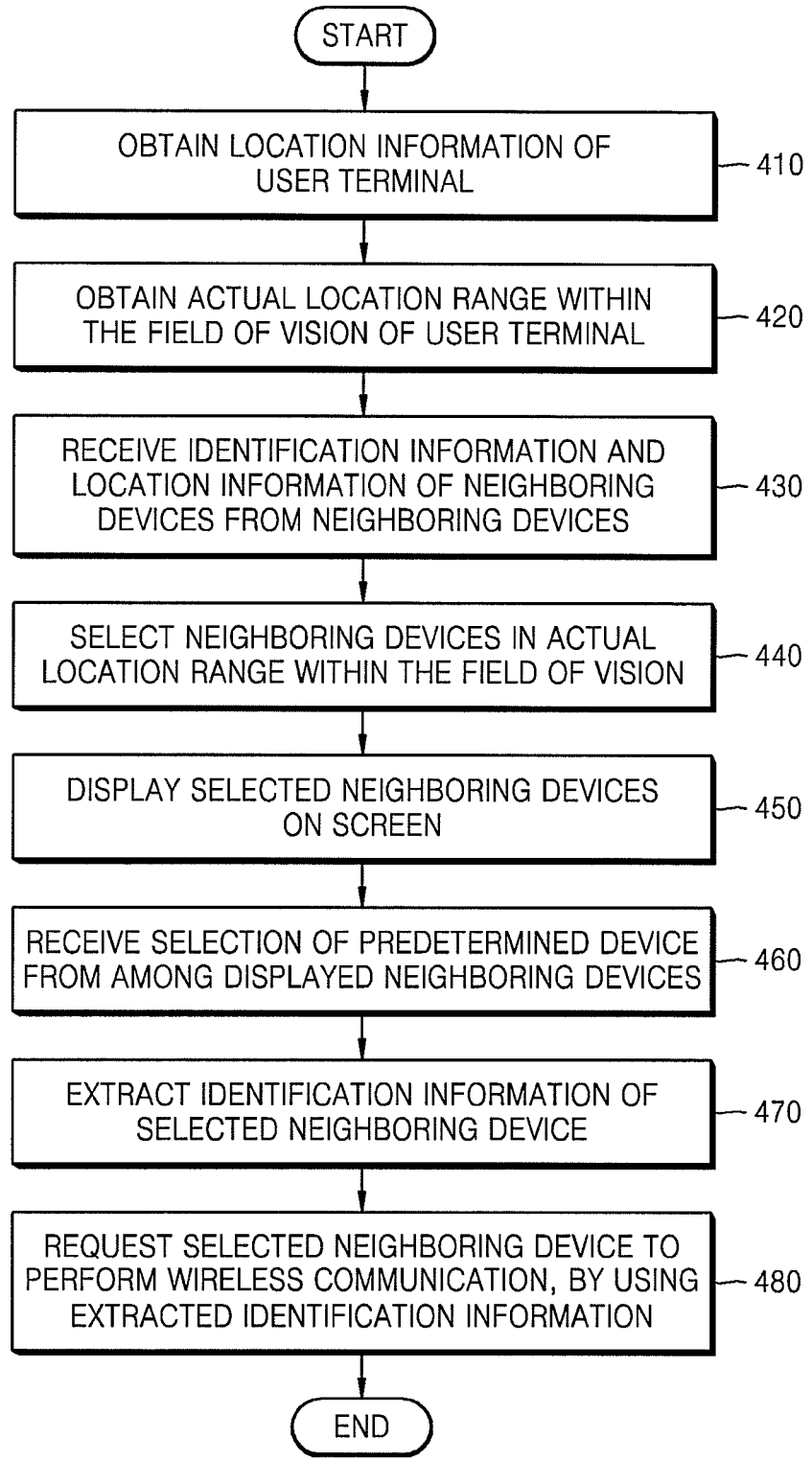
FIG. 4 is a flowchart illustrating a method of identifying a neighboring device, the method performed in a user terminal, according to an exemplary embodiment of the present invention.

FIG. 4 is a flowchart illustrating a method of identifying a neighboring device, the method performed in the user terminal 100, according to an exemplary embodiment of the present invention. Referring to FIG. 4, the user terminal 100 obtains its location information based on GPS signals or a base station in operation 410. By using its location information and angle of view, the user terminal 100 obtains the actual location range within the field of vision of a viewfinder or LCD of the user terminal 100 in operation 420. The user terminal 100 receives identification information and location information of the neighboring devices 130, 131, 132, 133, 140, and 150, from the neighboring devices 130, 131, 132, 133, 140, and 150 that can perform short-distance wireless communication with the user terminal 100 in operation 430. By using the received location information of the neighboring devices 130, 131, 132, 133, 140, and 150, the user terminal 100 selects neighboring devices located within the actual location range within the field of vision of the user terminal 100, that is, the neighboring devices 140 and 150, in operation 440.

The user terminal 100 displays the neighboring devices 140 and 150 located within the field of vision of the user terminal 100, on the viewfinder or LCD in operation 450. The user terminal 100 can convert the actual locations of the neighboring devices 140 and 150 into the locations on the viewfinder or LCD, by using the location information of the neighboring devices 140 and 150 located within the field of vision of the user terminal 100, the location information of the user terminal 100, the viewing angle of the user terminal 100, and the size of the viewfinder or LCD. The user terminal 100 can generate identifiers expressing the neighboring devices 140 and 150 located within the field of vision of the user terminal 100, and display the identifiers at the converted locations on the viewfinder or LCD. The identifiers may be product model numbers of the neighboring devices 140 and 150, blinking points or emoticons. The user terminal 100 receives an input from the user of a predetermined device desired to wirelessly communicate with from among the displayed neighboring devices 140 and 150 in operation 460. The user can select a desired neighboring device by using one of a keyboard, a touchpad, a touch screen, a joystick, a mouse, and a remote controller. The user terminal 100 extracts identification information of the selected neighboring device in operation 470. By using the extracted identification information, the user terminal 100 requests the neighboring device selected by the user to perform short-distance wireless communication in operation 480.

After the user terminal 100 selects the neighboring devices located in the actual location range within the field of vision of the user terminal 100 in operation 440, the user terminal 100 may also request all the selected neighboring devices 140 and 150 to perform short-distance wireless communication.

The user can photograph the view seen through the viewfinder or LCD by using the user terminal 100, thereby generating a media signal. If the neighboring devices 140 and 150 that can perform wireless communication with the user terminal 100 are within the field of vision of the user terminal 100, the user terminal 100 can extract the identification information of the neighboring devices 140 and 150 within the field of vision of the user terminal 100 by using the methods described above, and by using the extracted identification information, the user terminal 100 can request the neighboring devices 140 and 150 within the field of vision to perform wireless communication, thereby transmitting the obtained media signal.

The user terminal 100 can also obtain identification information of other devices belonging to the user of a neighboring device, through wireless communication with the neighboring device. In this case, the user terminal 100 can request the other devices to perform short-distance wireless communication by using the identification information of the other devices of the user of the neighboring device.

Figure 5:
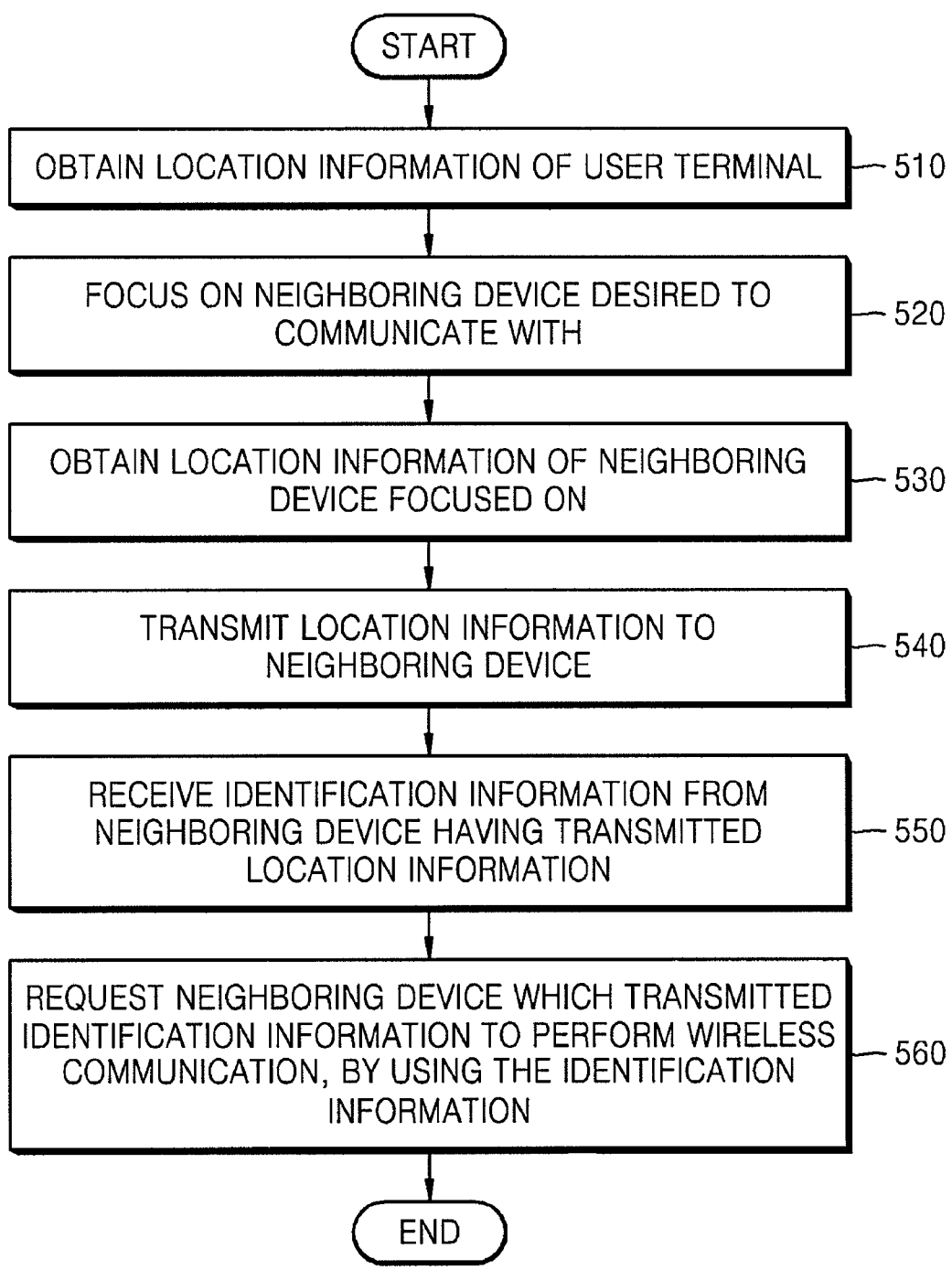
FIG. 5 is a flowchart illustrating a method of identifying a neighboring device, the method performed in a user terminal, according to another exemplary embodiment of the present invention.

FIG. 5 is a flowchart illustrating a method of identifying a neighboring device, the method performed in the user terminal 100, according to another exemplary embodiment of the present invention. Referring to FIG. 5, the user terminal 100 obtains the current location information of the user terminal 100 based on GPS signals or base stations in operation 510. The user terminal 100 is focused on a neighboring device 150, which is to be requested to perform communication among the neighboring devices 130, 131, 132, 133, 140, and 150, in operation 520. By using its location information, the user terminal 100 obtains the location information of the neighboring device 150 in operation 530. The user terminal 100 transmits the location information of the neighboring device 150 to the neighboring devices 130, 131, 132, 133, 140, and 150 that can perform short-distance wireless communication in operation 540. The user terminal 100 can generate a message requesting the neighboring devices 130, 131, 132, 133, 140, and 150 to transmit identification information if any of them are at the location indicated by the transmitted location information. The user terminal 100 transmits the generated message together with the location information to the neighboring devices 130, 131, 132, 133, 140, and 150. Each of the neighboring devices 130, 131, 132, 133, 140, and 150 receives the location information and the identification information transmission request message, and determines whether or not they are at the location indicated by the received location information or within a predetermined range from the indicated location. If the neighboring device is at the location indicated by the received location information or within a predetermined range from the indicted location, the neighboring device transmits its identification information to the user terminal 100. The user terminal 100 receives the identification information of the neighboring device from the neighboring device in operation 550. By using the received identification information, the user terminal 100 requests the neighboring device, which has transmitted the identification information, to perform wireless communication in operation 560. The user terminal 100 can also obtain identification information of other devices belonging to the user of the neighboring device which the user terminal 100 request to perform short-distance wireless communication. In this case, the user terminal 100 can request the other devices to perform short-distance wireless communication by using the identification information of the other devices of the user of the neighboring device, and can also transmit a media signal to the other devices.

Figure 6:
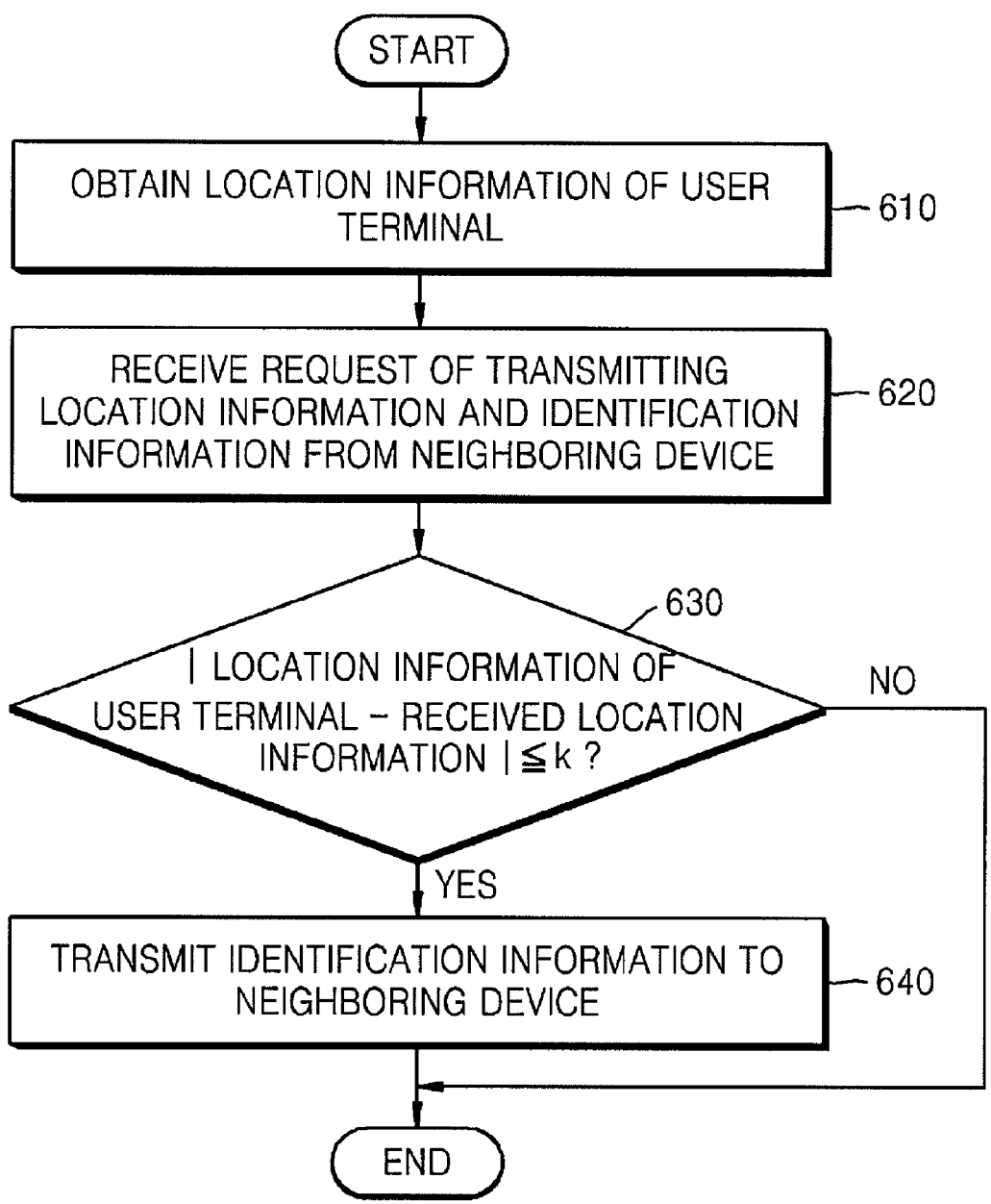
FIG. 6 is a flowchart illustrating a method of identifying a neighboring device, the method performed in a user terminal, according to another exemplary embodiment of the present invention.

FIG. 6 is a flowchart illustrating a method of identifying a neighboring device, the method performed in the user terminal 100, according to another exemplary embodiment of the present invention. Referring to FIG. 6, the user terminal 100 obtains its location by using GPS satellites or base stations in operation 610. For users of the neighboring devices 130, 131, 132, 133, 140 and 150 to perform short-distance wireless communication with the user terminal 100 located in a specific location, the neighboring devices 130, 131, 132, 133, 140 and 150 should know the identification information of the user terminal 100. The neighboring devices 130, 131, 132, 133, 140 and 150 can obtain the identification information of the user terminal 100 using the location information of the neighboring devices 130, 131, 132, 133, 140 and 150 themselves. For an example, the neighboring devices 130, 131, 132, 133, 140 and 150 may be focused on the user terminal 100 and may obtain the location information of the user terminal 100 using the location information of the neighboring devices 130, 131, 132, 133, 140 and 150. The neighboring devices 130, 131, 132, 133, 140 and 150 may obtain the identification information of the user terminal 100 using the location information of the user terminal 100. The user terminal 100 receives messages from neighboring devices that can perform short-distance wireless communication with the user terminal 100, that is, the neighboring devices 130, 131, 132, 133, 140, and 150, the messages requesting the user terminal 100 to transmit identification information on the condition that the difference between the location information of the user terminal 100 and the location information transmitted from the neighboring devices 130, 131, 132, 133, 140, and 150 is within a predetermined range, in operation 620. The short-distance wireless communication can be performed using at least one of WLAN, Bluetooth, ZigBee, and WiBro technologies. The user terminal 100 compares the location information of the user terminal 100 with the location information received from the neighboring devices 130, 131, 132, 133, 140, and 150 in operation 630. If the difference between the location information of the user terminal 100 and the location information received from the neighboring devices 130, 131, 132, 133, 140, and 150 is within a predetermined range, the user terminal 100 transmits the identification information of the user terminal 100 to the neighboring devices 130, 131, 132, 133, 140, and 150.

According to the exemplary embodiments of the present invention as described above, a method and apparatus for identifying a neighboring device of a user terminal by using a viewfinder or LCD of the user terminal can be provided.

According to the exemplary embodiments of the present invention, a method and apparatus for easily and simply identifying a neighboring device of a user terminal by which a device the user desires to communicate with can be selected while watching devices through a screen of the user terminal can also be provided.

According to the exemplary embodiments of the present invention, a method and apparatus for identifying a neighboring device of a user terminal by which desired identification information of a neighboring device can be obtained by using location information of the user terminal and neighboring devices can also be provided.

According to the exemplary embodiments of the present invention, a method and apparatus for identifying a neighboring device of a user terminal by which a media signal can be generated by the user terminal and at the same time the media signal can be transmitted to a neighboring device positioned on a screen of the user terminal can also be provided.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of identifying a device, which is performed in a user terminal, the method comprising:
    obtaining an actual location range within a field of vision of the user terminal, wherein the field of vision of the user terminal is provided through one of a viewfinder or a display of the user terminal, and wherein the user terminal is configured to establish a wireless communication only with one or more devices within the actual location range;
    receiving identification information and location information of a plurality of devices, directly from the plurality of devices;
    extracting the identification information of at least one device among the plurality of devices, based on the actual location range within the field of vision of the user terminal and the received location information and identification information of the plurality of devices, the at least one device being in the actual location range within the field of vision of the user terminal; and
    requesting, based on the extracted identification information of the at least one device, the at least one device to perform wireless communication with the user terminal.

2. The method of claim 1, wherein the obtaining of the actual location range within the field of vision of the user terminal comprises:
    obtaining location information of the user terminal;
    obtaining the field of vision of the user terminal, provided through one of the viewfinder or the display of the user terminal; and obtaining the actual location range within the field of vision of the user terminal, based on the location information and the field of vision of the user terminal.

3. The method of claim 2, wherein the obtaining of the location information of the user terminal comprises:
receiving a global positioning system (GPS) signal from a satellite or a wireless signal from a base station; and
obtaining the location information of the user terminal based on the received GPS signal or the received wireless signal.

4. The method of claim 2, wherein the location information of the user terminal comprises at least one of latitude, longitude, direction of the field of vision, and altitude.

5. The method of claim 2, further comprising:
obtaining from the at least one device identification information of other devices belonging to a user of the at least one device which is requested to perform wireless communication with the user terminal; and
requesting, based on the obtained identification information of the other devices, the other devices to perform wireless communication with the user terminal.

6. The method of claim 1, wherein the extracting of the identification information of the at least one device within the field of vision of the user terminal comprises:
selecting the at least one device, which is located in the actual location range within the field of vision of the user terminal, among the plurality of devices that can perform wireless communication with the user terminal; and
extracting the identification information of the selected device.

7. The method of claim 1, further comprising:
photographing devices within the field of vision of the user terminal and generating a media signal; and
requesting the devices within the field of vision of the user terminal to perform wireless communication with the user terminal and transmitting the media signal to the devices.

8. The method of claim 1, wherein the location information of the at least one device comprises at least one of latitude, longitude, direction of the field of vision, and altitude.

9. The method of claim 1, wherein the requesting the device located within the field of vision of the user terminal to perform wireless communication with the user terminal comprises:
displaying on the viewfinder or the display of the user terminal the at least one device located within the field of vision of the user terminal, wherein the field of vision is provided through one of the viewfinder or the display of the user terminal;
receiving a selection of a device, which is to be requested to perform wireless communication with the user terminal, from among the displayed at least one device within the field of vision of the user terminal; and
requesting the selected device to perform wireless communication with the user terminal.

10. The method of claim 9, wherein the displaying of the at least one device comprises:
converting locations of the at least one device to locations on the viewfinder, based on the location information of the at least one device within the field of vision, location information of the user terminal, a viewing angle of the user terminal, and a size of the viewfinder of the user terminal; and
displaying the at least one device on the converted locations on the viewfinder.

11. A user terminal for identifying a device, the user terminal comprising:
a location information processing unit configured to obtain an actual location range within a field of vision of the user terminal, wherein the field of vision is provided through one of a viewfinder or a display of the user terminal, and wherein the user terminal is configured to establish a wireless communication only with one or more devices within the actual location range;
a wireless communication unit configured to receive identification information and location information of a plurality of devices, directly from the plurality of devices; and
a media signal processing unit configured to photograph a view within the field of vision of the user terminal and generate a media signal,
wherein the location information processing unit extracts the identification information of at least one device in the actual location range within the field of vision of the user terminal among the plurality of devices, based on the received identification information and location information of the plurality of devices, and the wireless communication unit requests the at least one device to perform wireless communication with the user terminal, based on the extracted identification information of the at least one device.

12. The user terminal of claim 11, wherein the location information of the at least one device comprises at least one of latitude, longitude, direction of the field of vision, and altitude.

13. The user terminal of claim 11, wherein the wireless communication includes a short-distance wireless communication using at least one of wireless local area network, Bluetooth, ZigBee, and WiBro technologies.

14. The user terminal of claim 11, wherein the wireless communication unit obtains from the plurality of devices identification information of other devices belonging to a user of the at least one device which is requested to perform the wireless communication with the user terminal, and requests, based on the obtained identification information of the other devices, the other devices to perform wireless communication with the user terminal.

15. The user terminal of claim 11, wherein the location information processing unit comprises:
a global positioning system (GPS) signal reception unit which receives a GPS signal from a GPS satellite;
a location calculation unit configured to obtain location information of the user terminal by using the received GPS signal, and obtain, based on the location information of the user terminal, the actual location range within the field of vision of the user terminal; and
a device location processing unit configured to store the received identification information and the location information of the plurality of devices, and extract identification information of the at least one device in the actual location range within the field of vision of the user terminal.

16. The user terminal of claim 15, wherein the location information of the user terminal comprises at least one of latitude, longitude, direction of the field of vision, and altitude.

17. The user terminal of claim 11, further comprising:
an input and output unit configured to display the at least one device located within the field of vision of the user terminal on a viewfinder of the user terminal, and receive a selection of a device, which is to be requested to perform wireless communication with the user terminal, from among the displayed devices; and a control unit configured to control the user terminal so that the identification information of the at least one device located within the field of vision can be obtained and the selected device can be requested to perform wireless communication with the user terminal; and a memory unit configured to store programs required for controlling the user terminal.

18. The user terminal of claim 17, wherein the device location processing unit converts a location of the at least one device located within the field of vision of the user terminal into a location on the viewfinder of the user terminal, and the input and output unit displays the at least one device at the location on the viewfinder.

19. The user terminal of claim 17, wherein the wireless communication comprises short-distance wireless communication using at least one of wireless local area network, Bluetooth, ZigBee, and WiBro technologies.

20. A non-transitory computer-readable recording medium having embodied thereon a computer program for executing a method of identifying a device, the method comprising:

obtaining an actual location range within a field of vision of a user terminal, wherein the field of vision is provided through one of a viewfinder or a display of the user terminal, and wherein the user terminal is configured to establish a wireless communication only with one or more devices within the actual location range;

receiving identification information and location information of a plurality of devices, directly from the plurality of devices;

extracting the identification information of at least one device among the plurality of devices, based on the actual location range within the field of vision of the user terminal and the received location information and identification information of the plurality of devices, the at least one device being in the actual location range within the field of vision of the user terminal; and requesting, based on the extracted identification information of the at least one device, the at least one device to perform wireless communication with the user terminal.

* * * * *